(12) United States Patent
Seimiya et al.

(10) Patent No.: US 6,876,895 B2
(45) Date of Patent: Apr. 5, 2005

(54) ORDER ASSEMBLY PRODUCTION SYSTEM AND METHOD

(75) Inventors: Hiromi Seimiya, Hidaka (JP); Yukio Kunieda, Akiruno (JP); Tamotsu Tanaka, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/186,623

(22) Filed: Jul. 2, 2002

(65) Prior Publication Data

US 2003/0004595 A1 Jan. 2, 2003

(30) Foreign Application Priority Data

Jul. 2, 2002 (JP) ........................................ 2001-201113

(51) Int. Cl.$^7$ ............................................. G06F 19/00
(52) U.S. Cl. ......................... 700/106; 700/95; 700/107
(58) Field of Search ........................... 700/95, 97, 106, 700/107, 231, 233; 705/26; 235/383

(56) References Cited

U.S. PATENT DOCUMENTS

| | | | | |
|---|---|---|---|---|
| 4,992,940 A | * | 2/1991 | Dworkin | 705/26 |
| 5,995,757 A | * | 11/1999 | Amberg et al. | 717/175 |
| 6,167,383 A | * | 12/2000 | Henson | 705/26 |
| 6,182,275 B1 | * | 1/2001 | Beelitz et al. | 717/175 |
| 6,247,128 B1 | * | 6/2001 | Fisher et al. | 713/100 |

FOREIGN PATENT DOCUMENTS

| | | |
|---|---|---|
| CN | 1230724 A | 10/1999 |
| JP | 6-44280 | 2/1994 |
| JP | 7-227732 | 8/1995 |
| JP | 10-124526 | 5/1998 |
| JP | 11-285936 | 10/1999 |
| JP | 2000-202746 | 7/2000 |
| JP | 2000-263385 | 9/2000 |
| TW | 396388 | 7/2000 |
| TW | 380240 | 9/2000 |
| TW | 403873 | 9/2000 |

OTHER PUBLICATIONS

Yoshiyuki, Tanaka. Translated Japanese Publication 2000-263385. Published Sep. 26, 2000.*
Kunieda et al., "Order Assembly Production System and Method", U.S. Appl. No. 10/028,996, filed Dec. 21, 2001.
Kaburagi et al., "Order Assembly Production System and Method", U.S. Appl. No. 10/072,986, filed Feb. 12, 2002.

* cited by examiner

Primary Examiner—Leo Picard
Assistant Examiner—Alexander Kosowski
(74) Attorney, Agent, or Firm—Finnegan, Henderson, Farabow, Garrett & Dunner, L.L.P.

(57) ABSTRACT

An order assembly production system comprises means for showing an order-entry screen to select a frame of a product to be manufactured and an essential unit, means for generating a main body model number based on items selected on the order-entry screen, means for creating a manufacturing parts list for each main body model number based on a product components list showing a list of units as the selectable essential units of each model and the items selected on the order-entry screen, and means for settling delivery time based on a production schedule formed every model and the manufacturing parts list of each main body model number and instructing to start production.

23 Claims, 5 Drawing Sheets

| MANUFACTURING PARTS LIST | |
|---|---|
| MODEL NAME : D**A SERIES | |
| MAIN BODY MODEL NO. : PAA2580PMC**** | |
| PART NAME | QUANTITY |
| CPU P**III 800 | 1 |
| TFT DISPLAY (15-INCH) MADE BY T COMPANY | 1 |
| MEMORY MADE BY T COMPANY (128MB) | 3 |
| ⋮ | ⋮ |
| *SCREW | 38 |
| ⋮ | ⋮ |

FIG. 4

| MODEL | | | MAY | | SCHEDULE IN JUNE | SCHEDULE IN JULY | SCHEDULE IN AUGUST |
|---|---|---|---|---|---|---|---|
| | | | SCHEDULE | ORDER | | | |
| MODEL | SS3490 SERIES | | 1000 | 300 | 1000 | 500 | 500 |
| | UNIT | RATIO (%) | | | | | |
| | HDD | 10G | 10 | 100 | 100 | 100 | 50 | 50 |
| | | 15G | 40 | 400 | 0 | 400 | 200 | 200 |
| | | 20G | 50 | 500 | 200 | 500 | 250 | 250 |
| | ODD | CD-ROM | 60 | 600 | 0 | 600 | 300 | 300 |
| | | DVD | 30 | 300 | 300 | 300 | 150 | 150 |
| | | NONE | 10 | 100 | 0 | 100 | 50 | 50 |
| | COMMUNI-CATION | LAN | 40 | 400 | 200 | 400 | 200 | 200 |
| | | | | | | | |

ORDER ASSEMBLY PRODUCTION SYSTEM AND METHOD

CROSS-REFERENCE TO RELATED APPLICATIONS

This application is based upon and claims the benefit of priority from the prior Japanese Patent Application No. 2001-201113, filed Jul. 2, 2001, the entire contents of which are incorporated herein by reference.

BACKGROUND OF THE INVENTION

1. Field of the Invention

The present invention relates in general to a production system and method for product assembly, and more particularly to an order assembly production system and method.

2. Description of the Related Art

Conventional production systems can be roughly classified into the following two systems.

One of them is a made-to-stock production system (also called a sale-to-stock production system) in which procedures up to final assembly or shipment are performed based on demand forecast before an order is received, products are stocked, and an actual order is received. The other system is a made-to-order production system (also called an engineering-to-order system) in which a parts design or a product design is started after an order from a customer is received.

In the made-to-stock production system, lead time from order entry to shipment is short. However, since production is advanced based on the demand forecast for each predetermined period (generally, monthly demand forecast), there is a high probability that a balance between demand and supply is lost. Accordingly, when the forecast is failed (the demanded quantity is less than the forecasted quantity), the quantity of stock may be increased due to overproduction. The increase in stock causes obsolete product inventory, product price break, part valuation loss, deterioration in cash flow, or an increase in depreciation. When the demanded quantity is higher than the forecasted quantity, the product is out of stock, so that a sales opportunity thereof may be missed.

Currently, the life cycle of a product becomes shorter in association with a rapid technical innovation. Accordingly, the price of each of the product and the parts sharply comes down. Since market competition heats up, product price competition remarkably heats up. Moreover, user's needs are varied. In order to respond to the variable needs, the number of specifications and the number of product models have to be increased. An electronic device such as a personal computer is one example of the products.

Under the situations, according to the made-to-order production system, production is not made based on demand forecast. Accordingly, the quantity of stock is not increased due to overproduction. However, lead time from order entry to shipment is long. While the product is out of stock in shops for the lead time, a sales opportunity thereof may be missed.

As an example of the conventional individual order production system, "Manufacturing System and Assembly System of Computer System in Order Manufacturing Environment" is described in Japanese Patent Publication (KOKAI) No. 11-285936 (published on Oct. 19, 1988). In this prior-art example, a kit tray is prepared in response to a received order, and the constituent components for respective ordered products are held in the kit tray. The kit tray is transferred to an operation cell, and a team assembles the product in the cell. Thereafter, the product is tested and repaired based on information about an arbitrary problem given to the managing operation cell.

In recent years, manufacturing industries have to efficiently produce various models by a small quantity. In response to various needs of the customers, the following is under review in the made-to-order production system. That is, custom-made models to be manufactured based on specifications desired by the customers are prepared in addition to base models according to specifications determined by manufacturers. For example, as to personal computers, in case of the same model, a memory capacity, an HDD capacity, an optical disk drive, a communicating function and the like can be selected.

However, when all of the combinations of selectable units are set as custom-made model targets, the number of models (model numbers) reaches hundreds to thousands. In a manufacturing department, when a product is manufactured, a manufacturing parts list as a list of parts including a screw that constitute the product is needed every factory model number. The manufacturing parts list is formed by hand. Actually, it is impossible to form the manufacturing parts lists corresponding to thousands of model numbers. Accordingly, the number of custom-made models is limited. Further, a manufacturing line is operated in a model number unit. Accordingly, in diversified small-quantity production of a custom-made model or the like, the number of custom-made models is limited from the viewpoints of the occurrence of losses caused by frequent tooling changes and wasted manual motions.

A production schedule (parts acquisition schedule) for the custom-made model cannot previously be formed. After a customer or a salesperson requests a product, the production schedule is formed. Accordingly, exact delivery time cannot be answered.

Further, a planning or marketing department attempts to control the production of the custom-made model for each model number. However, all of the thousands of model numbers cannot be grasped. When the salesperson sells a product to the customer, he or she does not know which model should be recommended to the customer.

As mentioned above, in the conventional made-to-order production system, in order to stand prepared to manufacture products in accordance with all of specifications that may be requested by the customer, it is necessary to control huge numbers of models. Consequently, there is a problem that it takes very long time for preparation before manufacture (formation of the manufacturing parts list).

For the custom-made model produced by the made-to-order production system, the production schedule therefor cannot previously be formed. Consequently, there is a problem that delivery time is not found exactly.

BRIEF SUMMARY OF THE INVENTION

The present invention is directed to method and apparatus that substantially obviates one or more of the problems due to limitations and disadvantages of the related art. It is an object of the present invention to provide an order assembly production system and an order assembly production method as follows.

(a) An order assembly production system and method in which time required for preparation before manufacture is reduced.

(b) An order assembly production system and method in which delivery time can exactly be answered to a customer.

According to the present invention, an order assembly production system comprising:

first means for showing an order-entry screen to select a frame of a product to be manufactured and an essential unit; and second means for generating a main body model number based on items selected on the order-entry screen.

According to the present invention, an order assembly production method comprising the steps of:

showing an order-entry screen to select a frame of a product to be manufactured and an essential unit;

generating a main body model number based on items selected on the order-entry screen;

creating a manufacturing parts list for each main body model number based on a product components list showing a list of units as the selectable essential units of each model and the items selected on the order-entry screen; and settling delivery time based on a production schedule formed every model and the manufacturing parts list of each main body model number and instructing to start production.

According to the present invention, it is unnecessary to assign factory model numbers to all of custom-made models to prepare manufacturing parts lists, so that preparation before manufacture can be executed in short time. Since a production schedule is formed for each unit, delivery time of each part constituting a product is found. Consequently, the latest delivery time among delivery times of the units can be answered as delivery time of the product to the customer.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention in which.

DETAILED DESCRIPTION OF THE INVENTION

An embodiment of order assembly production system and method according to the present invention will now be described hereinbelow with reference to the drawings.

First, the principle of the embodiment according to the present invention will now be described.

Generally, one sales model number is allocated to one model as a product. The model denotes a product having the same frame (enclosure). The sales model number denotes a product classification number on a product catalog. In a case where products having the same sales model number are manufactured, the products may include different parts. For example, in case of personal computers of the same model, one personal computer has an HDD made by A Company and another one has an HDD made by B Company. They are distinguished from each other using factory model numbers. Accordingly, a plurality of factory model numbers correspond to one sales model number. During manufacture, the sales model number is not used. A manufacturing line is controlled and operated using the factory model number. Specifically, a manufacturing parts list showing an assembly of parts including a screw constituting the product is formed for each factory model number. Based on the manufacturing parts list, production planning and parts acquisition are performed. Sales model numbers, factory model numbers, manufacturing parts lists, and secondary information are needed as much as the models. However, it is unreasonable to previously form the manufacturing parts lists corresponding to the factory model numbers of thousands of custom-made models, any of the models may not being delivered up to the discontinuance of the product.

Figure 1:
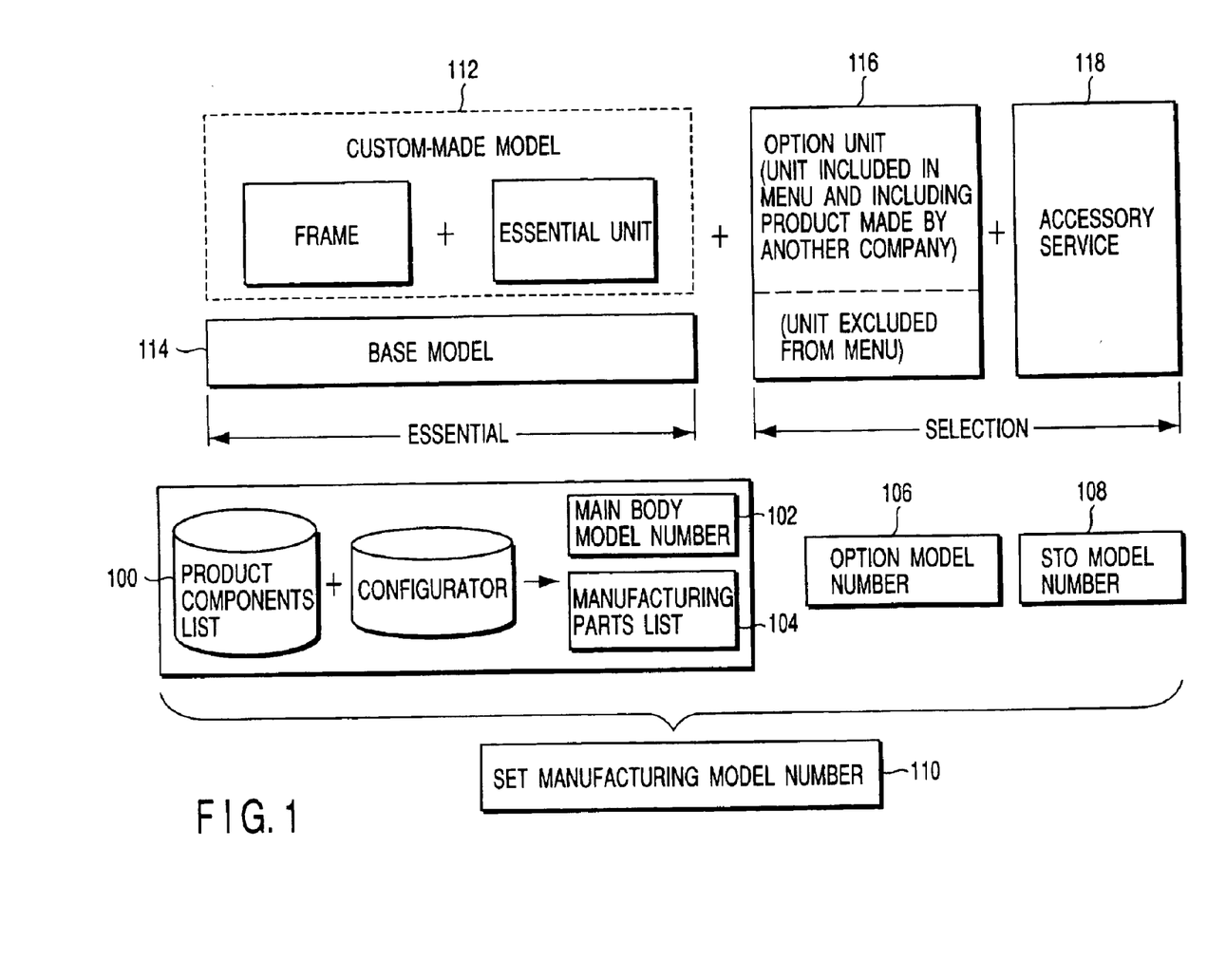
FIG. 1 is a diagram explaining the concept of a set manufacturing model number used in an order assembly production system according to one embodiment of the present invention.

According to the present embodiment, therefore, such a concept that a product components list is formed every model is introduced. Based on the product components list and selected parts, a main body model number is automatically generated and a manufacturing parts list is also automatically formed. An option model number and a service-to-order (STO) model number are combined with the automatically-generated main body model number to form a set manufacturing model number. FIG. 1 shows a relationship between the main body model number and the set manufacturing model number. The present invention can be applied to any product. The present embodiment will describe production of personal computers. The set manufacturing model number 110 comprises a combination of the main body model number of a custom-made model 112 (or a base model 114), an option model number 106 of an option unit 116, and an STO model number 108 of an accessory service 118. A main body model number 102 and a manufacturing parts list 104 are automatically formed from a product components list 100 by a configurator. In a factory, manufacture is controlled based on the set manufacturing model number 110.

Figure 2:
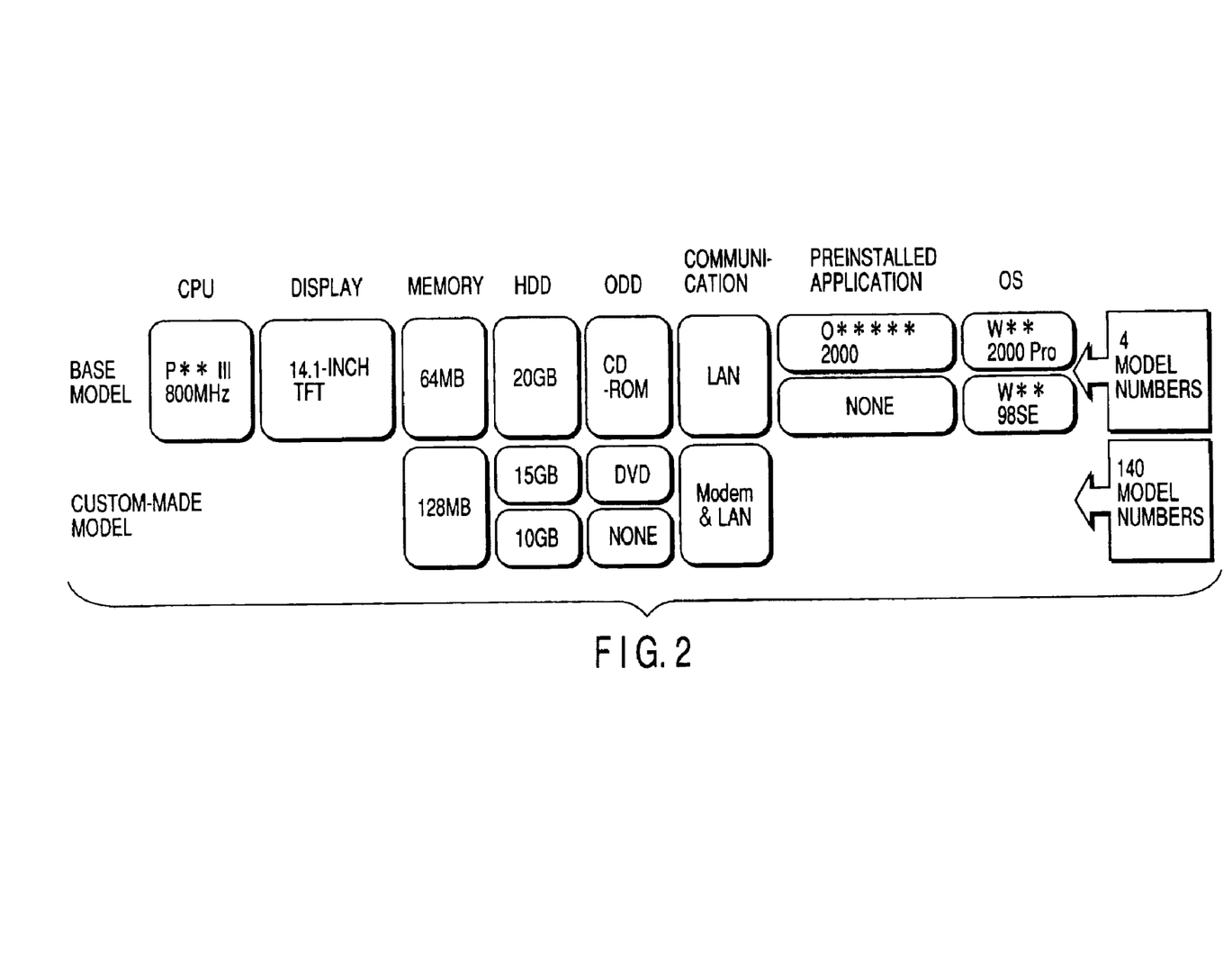
FIG. 2 is a diagram explaining a base model and a custom-made model.

As shown in FIG. 2, in the base model, hardware is fixed but an operating system (OS) and software to be preinstalled can be selected. The base model has four model numbers. In the custom-made model, hardware can be selected in accordance with a request from a customer. The customer can select a memory capacity, a hard disk drive (HDD) capacity, the type of optical disk drive (ODD), and a communicating function. When the customer selects software as in the case of the base model, 144 combinations are formed. When the number of model numbers regarding the base model is subtracted from the 144 combinations, the number of model numbers regarding the custom-made model alone is equal to 140.

The custom-made model includes a frame (enclosure) serving as the outline of model (series comprising many related models) and essential units (units shown in FIG. 2) such as a CPU, a display, a memory, an HDD, an ODD, a communicating function, preinstalled software, and an OS that are essentially needed for the fundamental operation of a personal computer. The frame is determined every model.

Option units such as a mouse, an add-on memory, various I/F cards, and a third-party option are added to the main body (custom-made model or base model) and are then used. Some of the option units are added to the main body internally and some of them are added to the main body externally. Some of the option units are predetermined as menu items and some of them are customized options excluded from the menu. Units made by other companies are also included.

As the accessory services, there are various services and supports such as assembly packaging, adjustment of attachments, introduction and instruction, maintenance, operating service, and recall which accompany the sale of the personal computer main body.

The option unit and the accessory service are arbitrary components. In some cases, none of them may be selected.

As mentioned above, the order assembly production system for manufacturing products according to different specifications in response to requests from the customers includes a build-to-order (BTO) system (a parts inventory is held and a part processing is started in accordance with order entry) and a configure-to-order (CTO) system (an in-process inventory is held and final assembly is started in accordance with specifications corresponding to an order).

When the customer or an salesperson combines the selected items to manufacture one custom-made model and then orders the model, the product components list corresponding to the frame is formed and the main body model number is automatically generated based on the combination of the units and the product components list. The set manufacturing model number is determined in accordance with the main body model number, the option model number, and the STO model number. A configurator, which will be described in detail later, automatically forms the main body model number and the manufacturing parts list. The set manufacturing model numbers are assigned to orders in a one-to-one relationship.

Figure 3:
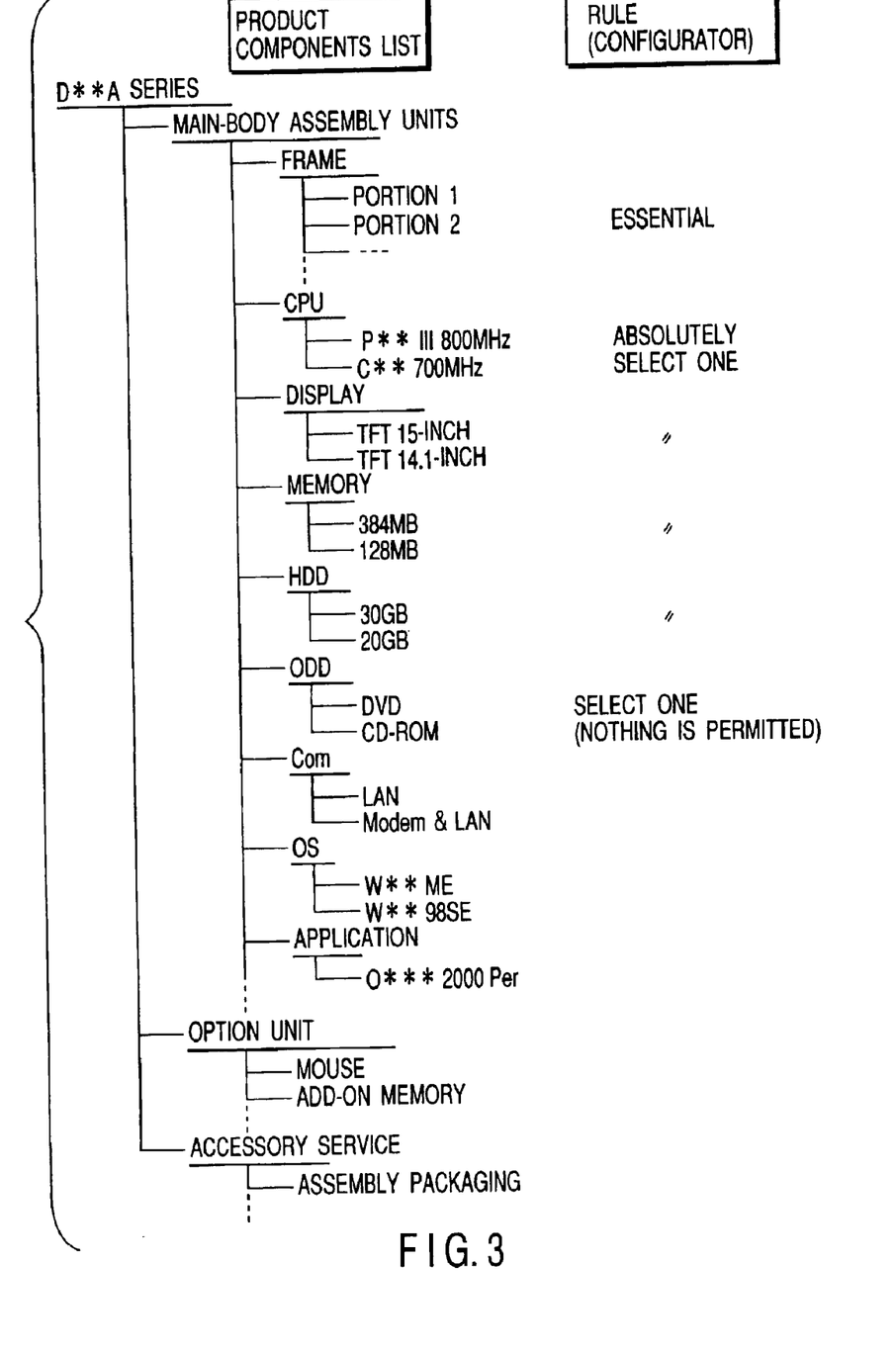
FIG. 3 is a diagram showing an example of a product components list.
Figure 4:
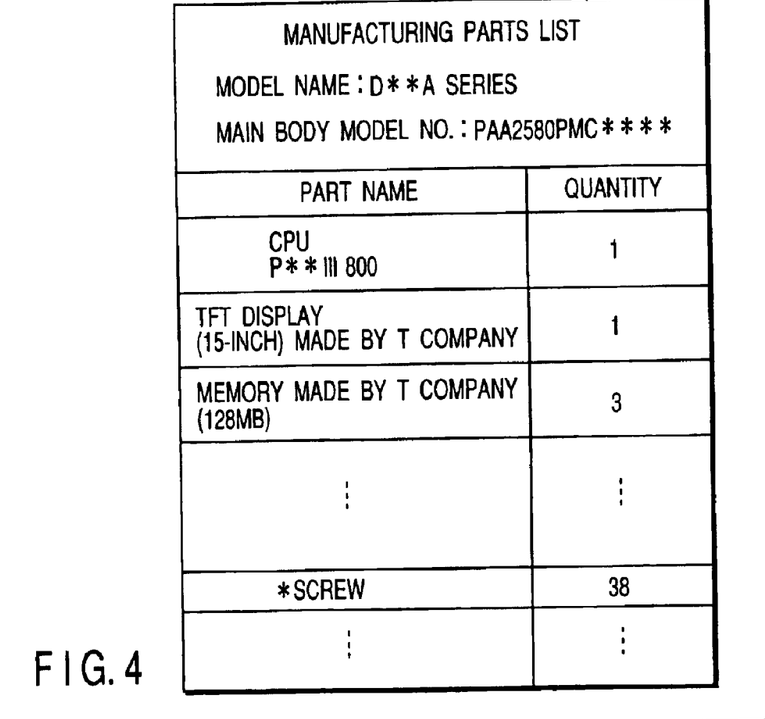
FIG. 4 is a diagram showing an example of a manufacturing parts list.

FIG. 3 shows the product components list and FIG. 4 shows the manufacturing parts list. As shown in FIG. 3, the product components list is a tree-structured list in which selectable units (essential units and option units) are registered every product series (model). The customer can know group information of alternatives from the list. The units are divided into three groups of main body assembly units (main body model numbers), option units (option model numbers), and accessory services (STO model numbers). According to the present embodiment, the product components list does not include the option units and the accessory services (refer to FIG. 1). The reason is as follows. Since the option units include units excluded from the menu, the option units require the involvement by a human being. Since the main body, the option units, and the accessory service are managed by different departments in the factory, they cannot be arranged in one list. However, when the above problems are solved, the product components list can include all of the units, the set manufacturing model number can be automatically generated by the configurator, and the manufacturing parts list can be formed every set manufacturing model number. The custom-made model is ordered with reference to the catalog. When the customer designates a model on an order-entry screen, a menu of units as alternatives can also be displayed in accordance with the product components list.

When the product components list and an order (unit selection information) are supplied to the configurator, the manufacturing parts list (FIG. 4) as a list of parts (including a screw) constituting the main body is automatically formed based on a selection rule set in the configurator. In other words, the selected units are extracted from the product components list for each model to form the manufacturing parts list for each main body model number.

The configurator also has secondary information indicating whether the unit is an essential unit or an option unit, whether the combination of units can be realized, and the price of each unit (not shown in FIG. 3). In addition to the above function, the configurator has the following functions. When the customer or the salesperson selects the units on the order-entry screen, the configurator checks whether the combination of the units can be realized based on the secondary information of the product components list. When the user selects any of the units, the configurator shows selectable units as alternatives from among the remaining units to the user (bundler function). After the selection of the units, the configurator calculates the price as either a Turn Out Value (TOV) or List Price (LP) of the main body in a manner of adding the prices of the units (pricer function). Further, the configurator has a retrieving function. That is, when the salesperson designates a price range or selects several units alone, the configurator shows a list of models included in the designated price range or displays recommended units. Accordingly, when the salesperson sells a product to the customer, he or she can easily find recommended units.

As mentioned above, according to the present embodiment, the manufacturing parts lists corresponding to the factory model numbers regarding all the custom-made models are not prepared but the product components list is prepared for each model. When the units are selected on the order-entry screen, the selected units are extracted from the product components list, so that the manufacturing parts list is automatically formed and the main body model number of the custom-made model is automatically generated. Accordingly, the salesperson or the customer doesn't need to grasp the model numbers of huge number of custom-made models. He or she can grasp the model names of the product series.

A production schedule will now be described. Hitherto, in factories, a production schedule is determined every factory model number based on a products-sales-inventory (PSI). The PSI is reviewed weekly and the production schedule is also reviewed weekly. When the production schedule is determined, the necessary amounts of parts needed to execute the production schedule are derived from the manufacturing parts list of a product to be manufactured and an order for the necessary parts is sent to a parts vendor. Actual production is not performed based on the production schedule alone. Only products corresponding to actual orders are manufactured in the production schedule (made-to-order production system). Accordingly, the salesperson needs to make an order with designated model number to a production system. A manufacturing department refers the production schedule of the ordered factory model number, confirms an acquisition situation regarding parts, and settles a production start date. When the production start date is settled, delivery time derived based on the production start date is answered to a sales department.

The operation to actually instruct the production start to the manufacturing line is called a production start instruction. The production start instruction is generated a plurality of times per day, namely, in time zone units (such as morning, afternoon, and night). Time to instruct the production start is several hours (e.g., four hours) before start time of each time zone. Before the production start is instructed, whether an order is received and whether parts needed for line assembly are available are confirmed. After both of the above conditions are satisfied, the production start is instructed.

The KANBAN number is assigned to the production schedule, to which the production start is instructed, of each order. The production schedule is transmitted to a manufacturing information system. A leader of each line confirms the factory model number, the KANBAN number, and the number of products for each KANBAN appeared in the manufacturing information system. After that, the leader instructs a marshalling man to collect parts and also instructs a line operator to manufacture a product. The marshalling man accumulates the numbers of parts for each factory model number, collects the parts, and then supplies them to the line. The operator manufactures the product of each factory model number (he or she is not conscious of the order of each product). The end product is sent to a warehouse. In the warehouse, a delivery slip is outputted every order, the slip is added to each product, and then the product is delivered.

The above-mentioned production schedule is formed only for the base model. The production schedule is not formed for the custom-made model because it is not certain whether the custom-made model is ordered. After the customer or the salesperson requests the custom-made model (by an order sheet, telephone, or e-mail), the production schedule for the custom-made model is formed. The production schedule for the custom-made model is formed in such a manner that the arrival of parts, an allocated stock of the base model, and a preparing situation of the manufacturing parts list are confirmed and, after that, a part of the production schedule for the base model is changed to a schedule for the custom-made model.

However, the production schedule for the custom-made model has to be changed in accordance with weekly demand and supply or a parts acquisition situation. Further, the production schedule is manually adjusted. It takes long time to change the production schedule. Accordingly, the base model can be delivered in five days after order entry because the production schedule is previously formed and parts are prepared. It takes longer time to deliver the custom-made model depending on the arrival of parts. Consequently, delivery time of the custom-made model is settled each time the order is received.

Figure 5:
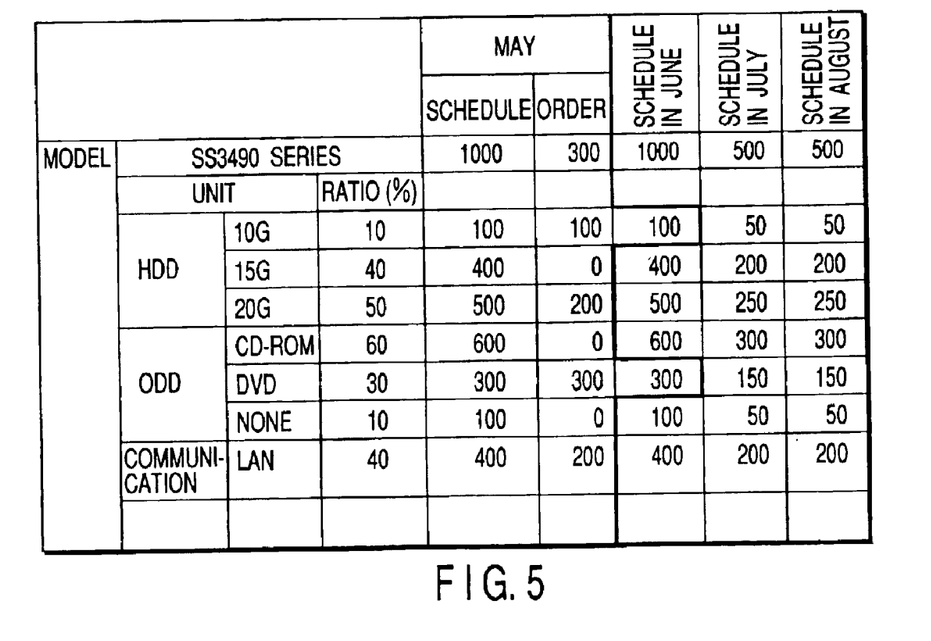
FIG. 5 is a table showing a production schedule of each set manufacturing model number, the schedule including a production schedule of each unit.

According to the present embodiment, as shown in FIG. 5, a production schedule for each model (comprising a frame and essential units) is subdivided into production schedules for the respective units. The production schedule for each unit is formed by setting the PSI of each unit. For the specific number of units, the ratio of selectable units to models (frames) is set as a percentage to form the production schedule for each unit. Parts are acquired based on the production schedule. For the base model, the PSI is set every model number as usual and the production schedule is formed every model number.

When an order is received, the set manufacturing model number is automatically generated. Based on the manufacturing parts list automatically formed with respect to the set manufacturing model number, the order is divided into unit orders. The unit orders are allocated to the production schedules for the respective units in the production schedule. Consequently, the latest delivery time among delivery times of the respective units is answered as delivery time regarding the set manufacturing model number. For example, it can be found that models using an HDD of 15 GB and models using an HDD of 20 GB can be delivered in May but models using an HDD of 10 GB cannot be delivered before June. Similarly, it can be found that models using a CD-ROM as an Optical Disk Drive (ODD) can be delivered in May but models using a DVD cannot be delivered before June.

As mentioned above, the production schedule for each unit is formed every model. If the production schedule for the custom-made model is not formed, it is possible to answer exact delivery time of any custom-made model using any combination of units in each model. For the option units, when the production schedule includes the option units, delivery time can be automatically settled. With respect to an order regarding a product including units excluded from the menu, action notice is sent to a person in charge of demand and supply, the schedule for such an order is adjusted manually, and after that, delivery time is answered.

Figure 6:
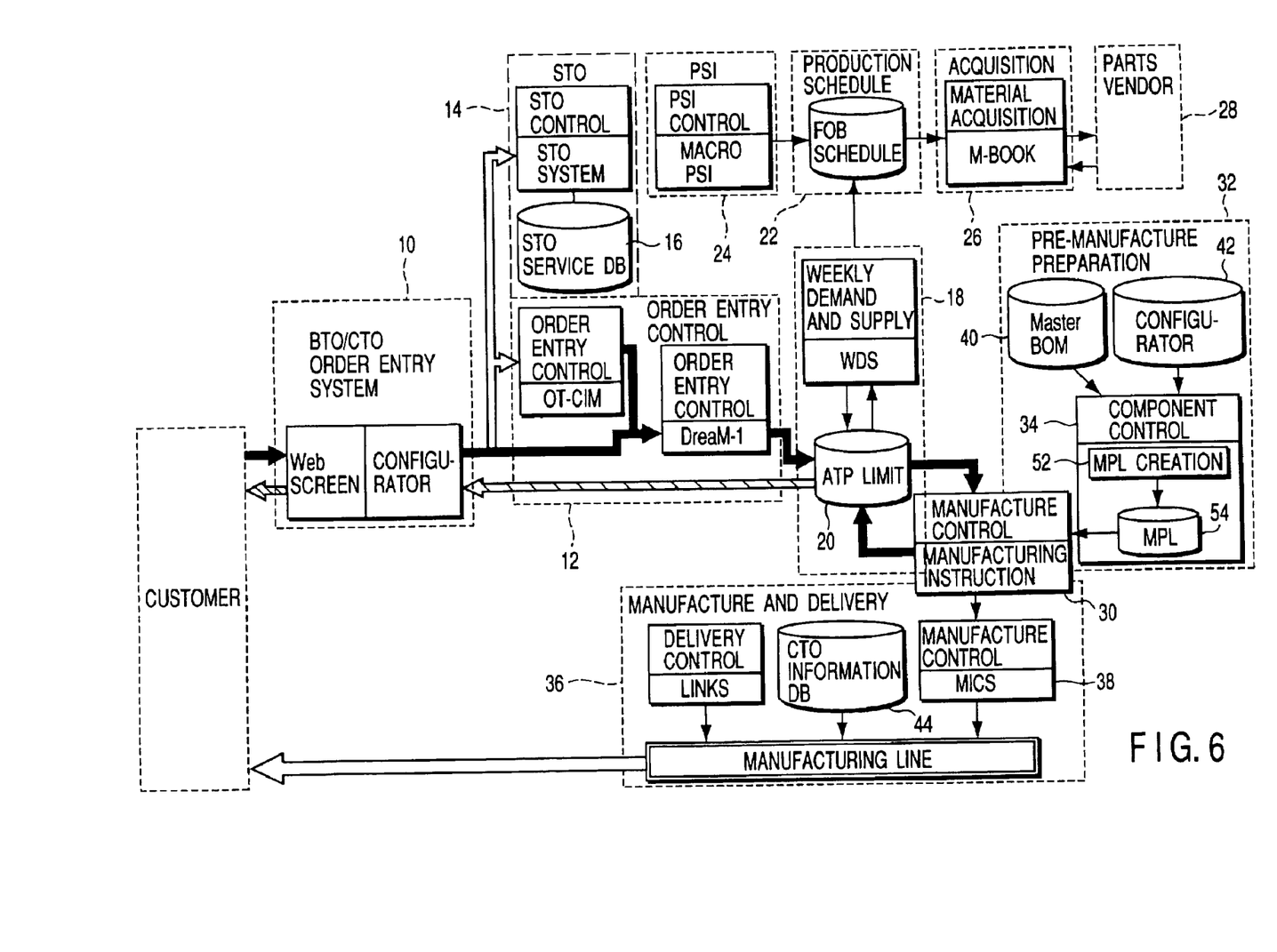
FIG. 6 is a diagram showing the whole constitution of an order assembly production system according to one embodiment of the present invention.

FIG. 6 is a block diagram of the entire order assembly production system according to the present embodiment. The system includes a BTO/CTO order entry system 10 that receives an order from the customer or the salesperson. The system 10 is coupled to a terminal of the customer or the salesperson via the Internet. The system 10 has a web screen on which order information (shown by black arrows) is received. Using the function of the configurator, the system 10 generates the set manufacturing model number, forms the manufacturing parts list, and checks whether the combination of units can be realized as necessary. When several units are selected, the system 10 shows selectable units as alternatives from among the remaining units to the user. When the selection of the units is completed, the system 10 adds the prices of the units to calculate the price of the product.

The order information outputted from the entry system 10 is supplied to an order entry control system 12 and a service-to-order (STO) system 14. The STO system 14 has an STO service database 16. The STO system 14 manages accessory services such as assembly packaging, adjustment of attachments, introduction and instruction, maintenance, operating services, and recall.

The order information outputted from the order entry control system 12 is supplied to a weekly demand and supply (WDS) system 18. The WDS system 18 has an available-to-promise (ATP) limit database 20 for available-to-promise. Delivery time information (shown by hatched arrows) is fed back from the database 20 to the customer or the salesperson through the entry system 10.

The WDS system 18 is coupled to a production schedule FOB (Free On Board) schedule system 22. The production schedule system 22 forms a production schedule in accordance with the PSI from a PSI control system 24 and weekly supply and demand from the WSD system 18. The production schedule system 22 sends an order regarding parts to a parts vendor 28 through an acquisition system 26. The production schedules of three months (the maximum schedules of 13 weeks) are formed and they are reviewed every week. Accordingly, the number of production schedules is reduced one by one every week from 13 week to 12 week, . . . . When the next month has come, the production schedules of 13 weeks are set.

A pre-manufacture preparation system 32 has a product-components-list BOM (master Bill of Materials) database 40 and a configurator database 42. The product-components-list database 40 has previously stored a product components list (refer to FIG. 3) for each model. The configurator database 42 has stored rules regarding the combination of units as shown in FIG. 3.

A component control system 34 has an MPL creation section 52 for creating a manufacturing parts list (MPL) for each main body model number based on the product-components-list database 40, the configurator database 42, and the order, and an MPL database 54 to store the formed manufacturing parts list.

A manufacture control system 30 generates a manufacturing instruction and a production start instruction based on the limit of available-to-promise from the ATP limit database 20 and the manufacturing parts list from the component control system 34 and sends the instructions to a manufacture control system 38 of a manufacture and delivery system 36. The limit of available-to-promise is determined form the production schedule reviewed based on the weekly demand and supply. Distribution information indicating how many orders regarding the production schedule have been received and how many orders can further be received is added to the limit of available-to-promise, the distribution information being created every sales route (each route can receive orders only within its own range). The manufacture and delivery system 36 has a CTO information database 44. All of information needed for the manufacturing line is stored in the CTO information database 44. When the production start instruction is received, orders are classified by model (every half-day) and an instruction to collect parts for each model is sent to the marshalling man (every frame). The marshalling man collects parts in accordance with the instructions. At the same time, an instruction MO (Manufacturing Order) label for each order is generated. The instruction describes which units are assembled to manufacture a product for each order. The line operator manufactures a model for each order with reference to the instruction. For a test program to be executed after assembly, which test should be performed to the completed model is automatically set based on the information stored in the CTO information DB 44. Different unit assemblies for the respective orders are tested certainly.

Differently from the base model, a product (CTO product) manufactured as a custom-made model is peculiar to the customer. It cannot be replaced to another model. Accordingly, line completion information is directly transmitted to the delivery system to constitute a setup for delivery to the customer.

As mentioned above, according to the present embodiment, when the product components list is formed every model, the manufacturing parts list for each model number can be automatically formed. Consequently, preparation time before manufacture for the custom-made model can be reduced. The production schedule for each unit is formed every model, so that the parts of the custom-made model can be previously acquired and a period for delivery can be realized as short as that of the base model. Available-to-promise can be automatically performed. When the user inputs an order, available-to-promise can be performed. Since the test program in the manufacturing line is automatically set in accordance with the order, a manufacture failure, which may be caused when hundreds to thousands of custom-made models are built, can surely be checked. Various checks can be made on the order-entry screen based on the product components list serving as a list of selectable units for each model. Consequently, it is possible to prevent the user from selecting units, which cannot be combined to each other. Further, when the user selects several units, the order-entry screen can show selectable units as alternatives from among the remaining units to the user. The order-entry screen can further show the total price to the user in a manner of adding the prices of the units. The order-entry screen has the retrieving function. When the salesperson sells a product to the customer, he or she can show a list of models in a price range desired by the customer or recommended models.

The present invention is not limited to the above embodiment but many modifications are possible within the purview of the invention without departing from the essence of the invention. For example, the present invention can also be applied to a computer-readable recording medium recording a program to allow a computer to execute predetermined means, allow a computer to function as predetermined means, or allow a computer to realize a predetermined function.

As mentioned above, according to the present invention, there are provided order assembly production system and method in which time necessary for preparation before manufacture is reduced. According to the present invention, there are also provided order assembly production system and method in which delivery time can exactly be answered to the customer.

What is claimed is:

1. An order assembly production system comprising:
   first means for showing an order-entry screen to allow a person to select a frame, essential units, and option units of a hardware product to be manufactured;
   second means for generating a main body model number and an option model number based on items selected on the order-entry screen;
   third means for storing a product components list indicating selectable essential and option units for each frame; and
   fourth means for forming a manufacturing parts list including names and numbers of parts needed to manufacture the hardware product with reference to the main body model number based on the product components list, wherein the main body model number and option model number form a set manufacturing model number for controlling manufacture in a factory.

2. The system according to claim 1, wherein the product to be manufactured comprises a personal computer; and the essential unit comprises at least one of a memory, a hard disk, an optical disk drive, a communicating function, an operating system, and a preinstalled software program.

3. The system according to claim 1, wherein the product to be manufactured comprises a personal computer; the order-entry screen can select an option unit comprising at least one of a mouse, an add-on memory, various I/F cards, and a third-party option; and said second means generates a set manufacturing model number based on the main body model number and a model number of the selected option unit.

4. The system according to claim 1, wherein the product to be manufactured comprises a personal computer; the order-entry screen can select an accessory service comprising at least one of assembly packaging, adjustment of attachments, introduction and instruction, maintenance, an operating service, and a recall service; and said second means generates a set manufacturing model number based on the main body model number and a model number of the selected accessory service.

5. The system according to claim 1, further comprising:
   fifth means for showing a retrieval screen on which a retrieving condition is inputted; and
   sixth means for retrieving a model based on the retrieving condition inputted on the retrieval screen to display constitutional items of the retrieved model.

6. The system according to claim 5, wherein the retrieving condition includes any of a price of the product, the frame, and the essential unit.

7. The system according to claim 1, further comprising means for determining whether a combination of the items selected on the order-entry screen can be realized based on a product components list, in which selectable units for each model are registered, to warn that the combination of the items is impossible.

8. The system according to claim 1, further comprising means for showing another item as a candidate, which can be combined to the items selected on the order-entry screen, based on a product components list in which selectable units for each model are registered.

9. The system according to claim 1, further comprising means for forming a manufacturing parts list including names and numbers of parts needed to manufacture the product based with reference to the main body model number based on a product components list in which selectable units for each model are registered.

10. The system according to claim 1, further comprising means for settling a price of the product with reference to the main body model number based on a product components list in which selectable units for each model and the prices of the units are registered.

11. The system according to claim 1, further comprising means for forming a production schedule for each model, the production schedule showing a prescribed number of units and a number of real orders with respect to each essential unit.

12. The system according to claim 1, further comprising means for dividing a product with a certain main body model number into units based on a manufacturing parts list including names and numbers of parts needed to manufacture the product with the main body model number when an order with the main body model number is inputted, to refer to a production schedule, and to answer the latest delivery time among delivery times of the units as delivery time of the ordered product with the main body model number.

13. An article of manufacture comprising a computer usable medium having computer readable program code means embodied therein, the computer readable program code means comprising:

computer readable program code means for causing a computer to display an order-entry screen to allow a person to select a frame, essential units, and option units of a hardware product to be manufactured;

computer readable program code means for causing a computer to generate a main body model number and an option model number based on items selected on the order-entry screen;

computer readable program code means for causing a computer to create a manufacturing parts list including names and numbers of parts needed to manufacture the hardware product with reference to the main body model number based on a product components list stored in a memory and indicating selectable essential and option units for each frame, the main body model number and option model number forming a set manufacturing model number for controlling manufacture in a factory; and computer readable program code means for causing a computer to settle delivery time based on a production schedule formed for every model and the manufacturing parts list of each main body model number and for instructing to start production.

14. The article of manufacture according to claim 13, wherein the product to be manufactured comprises a personal computer; and the essential unit comprises at least one of a memory, a hard disk, an optical disk drive, a communicating function, an operating system, and a preinstalled software program.

15. The article of manufacture according to claim 13, wherein the product to be manufactured comprises a personal computer; the order-entry screen can select an option unit comprising at least one of a mouse, an add-on memory, various I/F cards, and a third-party option; and said computer readable program code means for causing a computer to generate a main body model number generates a set manufacturing model number based on the main body model number and a model number of the selected option unit.

16. The article of manufacture according to claim 13, wherein the product to be manufactured comprises a personal computer; the order-entry screen can select an accessory service comprising at least one of assembly packaging, adjustment of attachments, introduction and instruction, maintenance, an operating service, and a recall service; and said computer readable program code means for causing a computer to generate a main body model number generates a set manufacturing model number based on the main body model number and a model number of the selected accessory service.

17. The article of manufacture according to claim 13, further comprising:

a retrieval screen on which a retrieving condition is inputted; and a model based on the retrieving condition inputted on the retrieval screen to display constitutional items of the retrieved model.

18. The article of manufacture according to claim 17, wherein the retrieving condition includes any of a price of the product, the frame, and the essential unit.

19. The article of manufacture according to claim 13, further comprising:

computer readable program code means for causing a computer to determine whether a combination of the items selected on the order-entry screen can be realized based on a product components list, in which selectable units for each model are registered, to warn that the combination of the items is impossible.

20. The article of manufacture according to claim 13, further comprising:

computer readable program code means for causing a computer to show another item as a candidate, which can be combined to the items selected on the order-entry screen, based on a product components list in which selectable units for each model are registered.

21. The article of manufacture according to claim 13, further comprising:

computer readable program code means for causing a computer to settle a price of the product with reference to the main body model number based on a product components list in which selectable units for each model and the prices of the units are registered.

22. The article of manufacture according to claim 13, further comprising:

computer readable program code means for causing a computer to form a production schedule for each model, the production schedule showing a prescribed number of units and a number of real orders with respect to each essential unit.

23. The article of manufacture according to claim 13, further comprising:

computer readable program code means for causing a computer to divide a product with a certain main body model number into units based on a manufacturing parts list including names and numbers of parts needed to manufacture the product with the main body model number when an order with the main body model number is inputted, to refer to a production schedule, and to answer the latest delivery time among delivery times of the units as delivery time of the ordered product with the main body model number.

* * * * *